(12) United States Patent
Chen

(10) Patent No.: US 10,352,235 B2
(45) Date of Patent: Jul. 16, 2019

(54) TURBOCHARGED DUAL-FUEL ENGINE

(71) Applicant: Xiaohui Chen, Zhejiang (CN)

(72) Inventor: Xiaohui Chen, Zhejiang (CN)

( * ) Notice: Subject to any disclaimer, the term of this patent is extended or adjusted under 35 U.S.C. 154(b) by 0 days.

(21) Appl. No.: 16/144,763

(22) Filed: Sep. 27, 2018

(65) Prior Publication Data
US 2019/0032556 A1 Jan. 31, 2019

Related U.S. Application Data

(63) Continuation-in-part of application No. PCT/CN2016/000436, filed on Aug. 8, 2016.

(30) Foreign Application Priority Data

Mar. 30, 2016 (CN) .......................... 2016 1 0209839

(51) Int. Cl.
*F02C 5/08* (2006.01)
*F02B 69/04* (2006.01)
*F02M 21/02* (2006.01)
*F04D 25/02* (2006.01)
*F02B 71/00* (2006.01)

(52) U.S. Cl.
CPC ................ *F02C 5/08* (2013.01); *F02B 69/04* (2013.01); *F02M 21/0215* (2013.01); *F04D 25/02* (2013.01); *F02B 71/00* (2013.01); *F05D 2220/32* (2013.01); *F05D 2220/40* (2013.01); *Y02T 10/146* (2013.01); *Y02T 10/32* (2013.01); *Y02T 10/36* (2013.01)

(58) Field of Classification Search
CPC . F02B 69/04; F02B 71/00; F02C 5/08; F02M 21/0215; F04D 25/02; F05D 2220/32; F05D 2220/40; Y02T 10/146; Y02T 10/32; Y02T 10/36
See application file for complete search history.

(56) References Cited

U.S. PATENT DOCUMENTS

2017/0321599 A1* 11/2017 Chen .................... F02C 5/00

FOREIGN PATENT DOCUMENTS

| CN | 204458031 U | 7/2015 |
|---|---|---|
| CN | 204553175 U | 8/2015 |
| CN | 205445794 U | 8/2016 |
| EP | 1801386 A1 | 6/2007 |
| GB | 2515106 A | 12/2014 |

* cited by examiner

Primary Examiner — Brandon D Lee
(74) Attorney, Agent, or Firm — Wayne & Ken, LLC; Tony Hom

(57) ABSTRACT

Disclosed is a turbocharged dual-fuel engine, including a first driving system, a second driving system, a third driving system and a fourth driving system. The first driving system, the second driving system, the third driving system and the fourth driving system have the same structure. The first driving system includes a cylinder body in a gas compression device, a gas delivery pipe, a one-dimensional internal combustion engine, a tenth motor, an axial-flow gas compressor and a first lever braking device in a natural gas storage device. The tenth motor is connected with the axial-flow gas compressor. The axial-flow gas compressor is driven by the tenth motor.

1 Claim, 13 Drawing Sheets

TURBOCHARGED DUAL-FUEL ENGINE

CROSS-REFERENCE TO RELATED APPLICATIONS

This application is a continuation of International Application No. PCT/CN2016/000436 with a filing date of Aug. 8, 2016, designating the United States, now pending, and further claims to Chinese Application No. 201610209839.5 with a filing date of Mar. 30, 2016. The content of the aforementioned applications, including any intervening amendments thereto, are incorporated herein by reference.

TECHNICAL FIELD

The present disclosure relates to an engine manufacturing technology.

BACKGROUND OF THE PRESENT INVENTION

An engine is a machine capable of transforming other forms of energy into mechanical energy, and includes an internal combustion engine (gasoline engine, etc.), an external combustion engine (Stirling engine, steam engine, etc.), a motor, etc. For example, the internal combustion engine usually converts chemical energy into mechanical energy. The engine is suitable for power generating units, and may refer to an entire machine including the power units (such as gasoline engine and aero-engine).

SUMMARY OF THE PRESENT INVENTION

The present disclosure includes the following contents:

A turbocharged dual-fuel engine includes a first driving system, a second driving system, a third driving system and a fourth driving system, where the first driving system, the second driving system, the third driving system and the fourth driving system have the same structure.

The first driving system includes a cylinder body in a gas compression device, a gas delivery pipe, a one-dimensional internal combustion engine, a tenth motor, an axial-flow gas compressor and a first lever braking device in a natural gas storage device; the tenth motor is connected with the axial-flow gas compressor; and the axial-flow gas compressor is driven by the tenth motor.

The gas compression device includes a rack, a gas compressor disposed on an upper part of the rack, and the cylinder body disposed on a lower part of the rack.

The gas compressor includes a first inner frame and a first outer shell. The first inner frame includes a first upper press plate and a dual-layer cylindrical plate. The dual-layer cylindrical plate includes a first-layer cylindrical plate and a second-layer cylindrical plate. The first-layer cylindrical plate has a cylindrical shape and a caliber less than a width of the first upper press plate. The second-layer cylindrical plate also has a cylindrical shape and a caliber less than the caliber of the first-layer cylindrical plate. The first-layer cylindrical plate is sleeved outside the second-layer cylindrical plate. A top of the first-layer cylindrical plate is fixedly connected with a bottom of the first upper press plate. A top of the second-layer cylindrical plate is also fixedly connected with the bottom of the first upper press plate. A first gas inlet is formed in an upper part of the first outer shell. Part of a bottom of the first outer shell is convex downward to form a dual-layer cylindrical plate groove corresponding to the dual-layer cylindrical plate. The dual-layer cylindrical plate groove includes a first-layer cylindrical plate groove and a second-layer cylindrical plate groove. The first-layer cylindrical plate can move up and down in the first-layer cylindrical plate groove. The second-layer cylindrical plate can move up and down in the second-layer cylindrical plate groove. A first gas outlet is also formed in the bottom of the first outer shell. The first inner frame is disposed in the first outer shell, and a side surface of the first upper press plate is bonded with an inner wall of the first outer shell. The first-layer cylindrical plate forms a circle with part of the first upper press plate and part of the first outer shell to form a first assistant gas chamber. Part of the bottom of the first outer shell forms a circle with the first-layer cylindrical plate, the second-layer cylindrical plate and part of the first upper press plate to form a second assistant gas chamber. The second-layer cylindrical plate forms a circle with part of the bottom of the first outer shell and part of the first upper press plate to form a main gas chamber.

A second gas inlet communicated with the first gas outlet is formed in a top of the cylinder body. A first thread is disposed at a mouth edge of the second gas inlet. A thread cap is disposed at the second gas inlet. Inside of the thread cap is hollowed to form a gas outlet pipe. A second gas outlet communicated with the gas outlet pipe is formed in a left part of the thread cap. A third gear is disposed at an outer wall of an upper part of the thread cap. The third gear is fixed to the outer wall of the upper part of the thread cap. A thread matched with the first thread at the mouth edge of the second gas inlet is disposed at an outer wall of a lower part of the thread cap. A second gas inlet cover is disposed below the thread cap. A longitudinal cross section of the second gas inlet cover is in a "U" shape. The second gas inlet cover is located in the cylinder body. A first groove is formed in an upper part of part of the cylinder body around the second gas inlet. A bottom end of the first gas outlet is disposed in the first groove. A second groove is formed in an upper part of part of the cylinder body near the first groove. A second thread is disposed in the second groove.

An upper part of the rack is provided with a first bracket. Second brackets are respectively disposed on a left side and a right side of the middle of the rack. A first driving device for driving the first upper press plate to move up and down is disposed on the first bracket. Second driving devices for driving the gas compressor to move up and down are disposed on the second brackets.

The first lever braking device includes a third motor, a first bevel gear, a first vertical rod, a first lever, a second vertical rod, a second bevel gear, a third bracket, a fourth bracket, a fifth bracket and a sixth bracket. A third gear rack is disposed on the first vertical rod. The third gear rack is fixed to the first vertical rod. A fourth gear rack is disposed on the second vertical rod. The fourth gear rack is fixed to the second vertical rod. A top of the first vertical rod is fixedly connected with a bottom end of a right part of the first lever. A top of the second vertical rod is fixedly connected with a bottom end of a left part of the first lever. The third motor is disposed on the third bracket. The first bevel gear is disposed on the fourth bracket. The first lever is disposed on the fifth bracket. The second bevel gear is disposed on the sixth bracket. A fourth gear is disposed on the third motor. The first bevel gear is engaged with the fourth gear on the third motor, and is also engaged with the third gear rack on the first vertical rod. The second bevel gear is engaged with the fourth gear rack on the second vertical rod, and is also engaged with the third gear on the thread cap.

A seventh bracket is disposed on a right upper part of the rack. The first driving device includes a first motor disposed on the first bracket, a first gear disposed on the first bracket, a first dowel bar disposed vertically and having a bottom end fixed to the first upper press plate, a first gear rack disposed on the first dowel bar, and a second lever braking device. The second lever braking device includes a third vertical rod, a second lever, a fourth vertical rod, a fifth gear rack and a sixth gear rack. The second lever is disposed on the seventh bracket. The fifth gear rack is fixed to the third vertical rod. The sixth gear rack is fixed to the fourth vertical rod. A top of the third vertical rod is fixedly connected with a bottom end of a left part of the second lever. A top of the fourth vertical rod is fixedly connected with a bottom end of a right part of the second lever. The first gear is engaged with the first gear rack, and is also engaged with the fifth gear rack. A fifth gear is disposed on the first motor. The fifth gear is engaged with the sixth gear rack.

Each of the second driving devices includes a second motor disposed on the second bracket, a second gear disposed on the second bracket and driven by the second motor, ad second dowel bar in an "L" shape fixed to an outer wall of the first outer shell, and a second gear rack disposed on the second dowel bar. The second gear is engaged with the second gear rack. The second motor can drive the second gear to rotate. The action of the second driving devices is to push the gas compressor up after the gas compressor compresses gas, such that the bottom end of the first gas outlet of the gas compressor is separated from the first groove. The second driving devices are respectively disposed on the second brackets on the left side and the right side of the middle of the rack.

A second gas inlet cover holder used to hold the second gas inlet cover is disposed near the second gas inlet cover. A top of the second gas inlet cover holder is fixedly connected with a bottom of part of the cylinder body around the second gas inlet. The second gas inlet cover is disposed in the second gas inlet cover holder. A cover groove matched with part of an upper part of the second gas inlet cover is formed in an upper part of the second gas inlet cover holder. Part of the upper part of the second gas inlet cover can move up and down in the cover groove. A third gas inlet communicated with an inner part of the cylinder body is formed in a right part of the second gas inlet cover holder. A gas passage communicated with the inner part of the cylinder body is formed in a bottom of the second gas inlet cover holder.

The one-dimensional internal combustion engine includes a compressor, a combustion chamber, a pipeline, a spray pipe, a standby oil tank, an oil delivery pipe, a third driving device, a first safety device, a second safety device, an electrical ignition device, an eighth bracket, a ninth bracket, a tenth bracket and an eleventh bracket. The third driving device is disposed on the eighth bracket. The first safety device is disposed on the ninth bracket. The second safety device is disposed on the tenth bracket. The standby oil tank is disposed on the eleventh bracket. The oil delivery pipe is disposed in the standby oil tank.

The pipeline is formed by connecting a left part of the pipeline and a right part of the pipeline. The compressor includes a second inner frame and a second outer shell. The second inner frame includes a second upper press plate and an internal cylindrical plate. Inner parts of the second upper press plate and the internal cylindrical plate are hollow. A vent is formed in the second upper press plate. A top of the internal cylindrical plate is fixed to a lower side of the second upper press plate. The internal cylindrical plate has a cylindrical shape, and has a caliber less than a width of the second upper press plate. A seventh gas inlet is formed in a left part of the second outer shell. A fifth gas inlet is formed in a right part of the second outer shell. The fifth gas inlet is located at a right lower side of the seventh gas inlet. The axial-flow gas compressor is disposed at a left upper side of the seventh gas inlet. A gas outlet of the axial-flow gas compressor is communicated with the seventh gas inlet.

One end of the gas delivery pipe is communicated with the fifth gas inlet, and the other end of the gas delivery pipe is communicated with the gas outlet pipe in the gas compression device. Part of a bottom of the second outer shell is convex downward to form an internal cylindrical plate groove corresponding to the internal cylindrical plate. The internal cylindrical plate can move up and down in the internal cylindrical plate groove. A sixth gas inlet is formed in a bottom of the internal cylindrical plate groove. The left part of the pipeline is disposed at a lower side of the sixth gas inlet. The left part of the pipeline is communicated with the sixth gas inlet. An eighth gas inlet is formed in a right part of the combustion chamber. The right part of the pipeline is disposed at a left side of the eighth gas inlet. The right part of the pipeline is communicated with the eighth gas inlet. The left part of the pipeline is communicated with the right part of the pipeline. An outlet is also formed in the bottom of the second outer shell. A top end of combustion chamber is fixedly connected with a bottom end of the outlet. A top end of the spray pipe is fixedly connected with a bottom end of the combustion chamber. A small port is formed at a right part of the spray pipe. A control box is disposed at the small port. An adjusting ingot is disposed in the control box. A left part of the control box is communicated with the spray pipe, and a micropore is formed at a right part of the control box. A turbo wheel and a turboshaft are disposed in a tail end of the spray pipe. The second inner frame is disposed in the second outer shell. A side surface of the second upper press plate is bonded with an inner wall of an upper part of the second outer shell. The internal cylindrical plate forms a circle with part of the second upper press plate and part of the bottom of the second outer shell to form a main pressure chamber. The internal cylindrical plate, the rest part of the second upper press plate except part of the second upper press plate that participates in encircling to form the main pressure chamber, and part of the second outer shell form a circle to form an assistant pressure chamber.

The third driving device includes a seventh motor, a seventh gear, a seventh dowel bar and a seventh gear rack disposed on the seventh dowel bar. A bottom of the seventh dowel bar is fixed to an upper side of the second upper press plate. The seventh gear rack is engaged with the seventh gear. The seventh motor can drive the seventh gear to rotate.

The first safety device includes an eighth motor, an eighth gear, a bumper and an eighth gear rack fixed to a lower side of a right part of the bumper. The eighth motor can drive the eighth gear to rotate. The eighth gear rack is engaged with the eighth gear. The action of the bumper is to insert a left part of the bumper into the middle of the seventh gear rack to prevent the seventh gear rack from moving up.

The second safety device is disposed at a right side of the control box. The second safety device includes a ninth motor, a ninth gear, a ninth dowel bar and a ninth gear rack. The ninth motor can drive the ninth gear to rotate. A left part of the ninth dowel bar extends into the control box from the micropore. The ninth gear rack is disposed at a lower side of a right part of the ninth dowel bar. The ninth gear rack is fixedly connected with the right part of the ninth dowel bar.

The ninth gear rack is engaged with the ninth gear. A right part of the adjusting ingot is fixedly connected with a left part of the ninth dowel bar. The adjusting ingot and part of the left part of the ninth dowel bar can move left and right in the control box.

The standby oil tank is disposed at a right upper side of the fifth gas inlet. The electrical ignition device is disposed at a left side of the spray pipe.

The turboshaft in the first driving system is fixedly connected with a rotor on the axial-flow gas compressor in the second driving system. The turboshaft in the second driving system is fixedly connected with a rotor on the axial-flow gas compressor in the third driving system. The turboshaft in the third driving system is fixedly connected with a rotor on the axial-flow gas compressor in the fourth driving system. The turboshaft in the fourth driving system is fixedly connected with a rotor on the axial-flow gas compressor in the first driving system.

DETAILED DESCRIPTION OF THE PRESENT INVENTION

Specific embodiments of the present disclosure are further described below with reference to the drawings.

A turbocharged dual-fuel engine includes a first driving system, a second driving system, a third driving system and a fourth driving system. The first driving system, the second driving system, the third driving system and the fourth driving system have the same structure.

Figure 6:
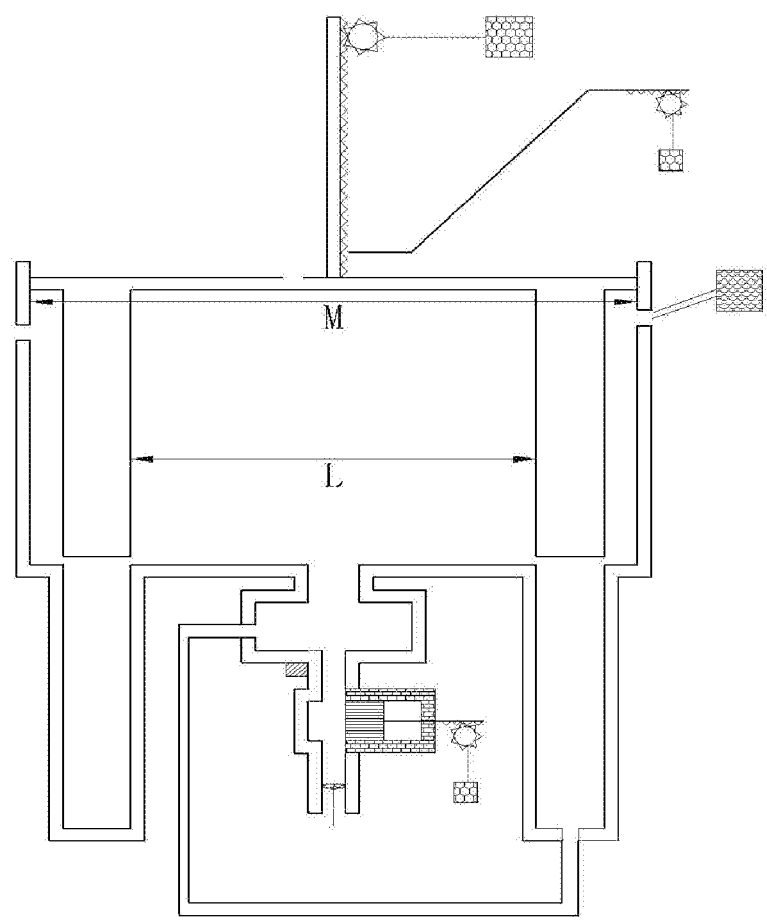
FIG. 6 is a dimensional schematic diagram of part of components of the one-dimensional internal combustion engine.
Figure 7:
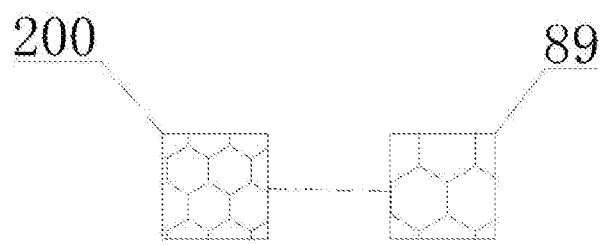
FIG. 7 is a schematic diagram showing the connection of the tenth motor with the axial-flow gas compressor.
Figure 8:
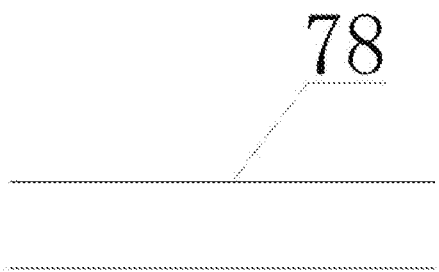
FIG. 8 is a schematic diagram of the gas delivery pipe.
Figure 9:
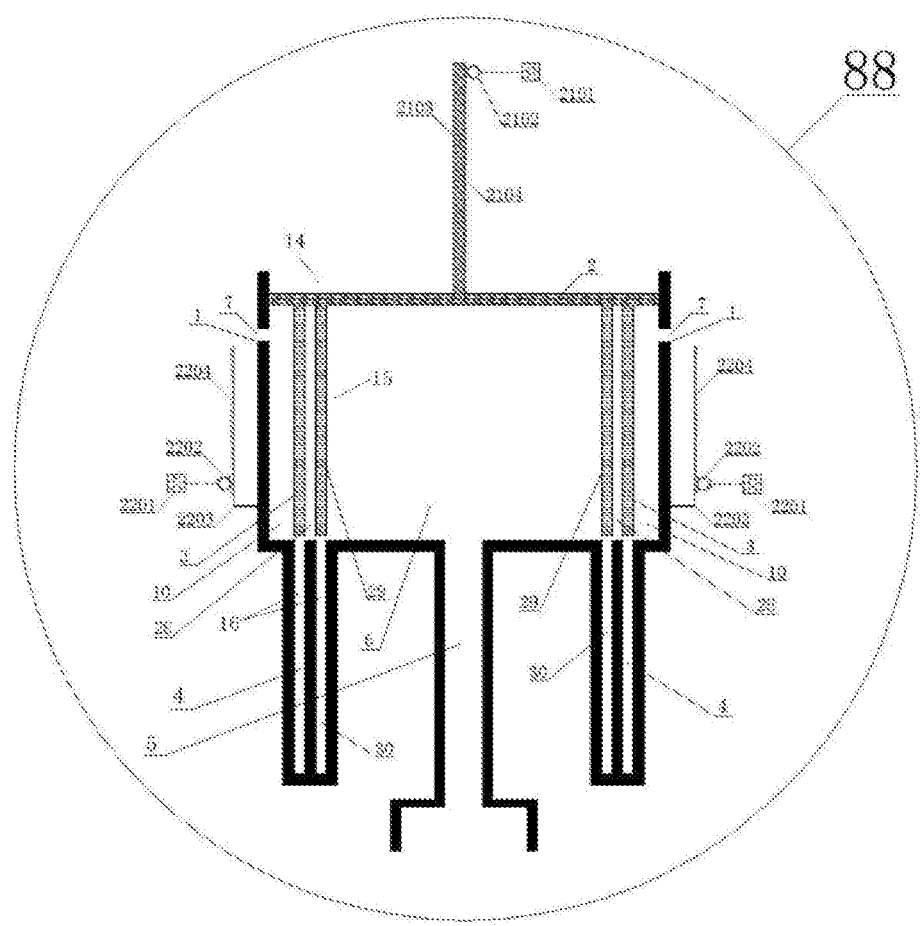
FIG. 9 is a schematic diagram of the gas compressor.
Figure 10:
FIG. 10 is a schematic diagram of the oil delivery pipe.
Figure 11:
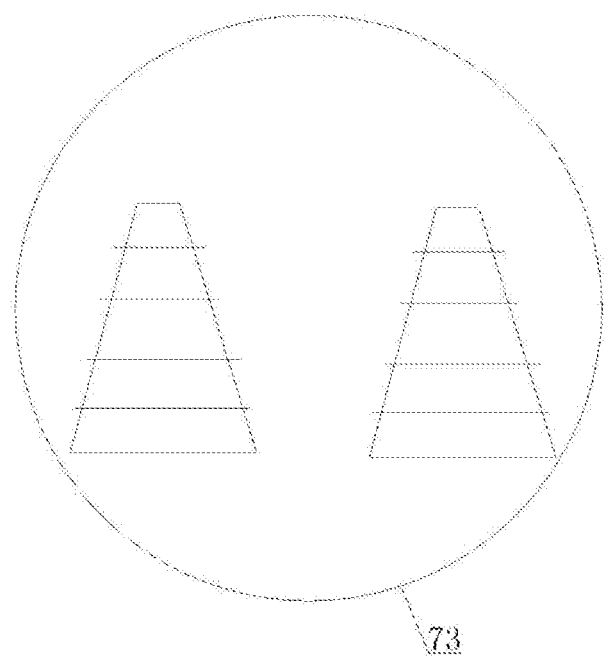
FIG. 11 is a schematic diagram of the seventh bracket.
Figure 17:
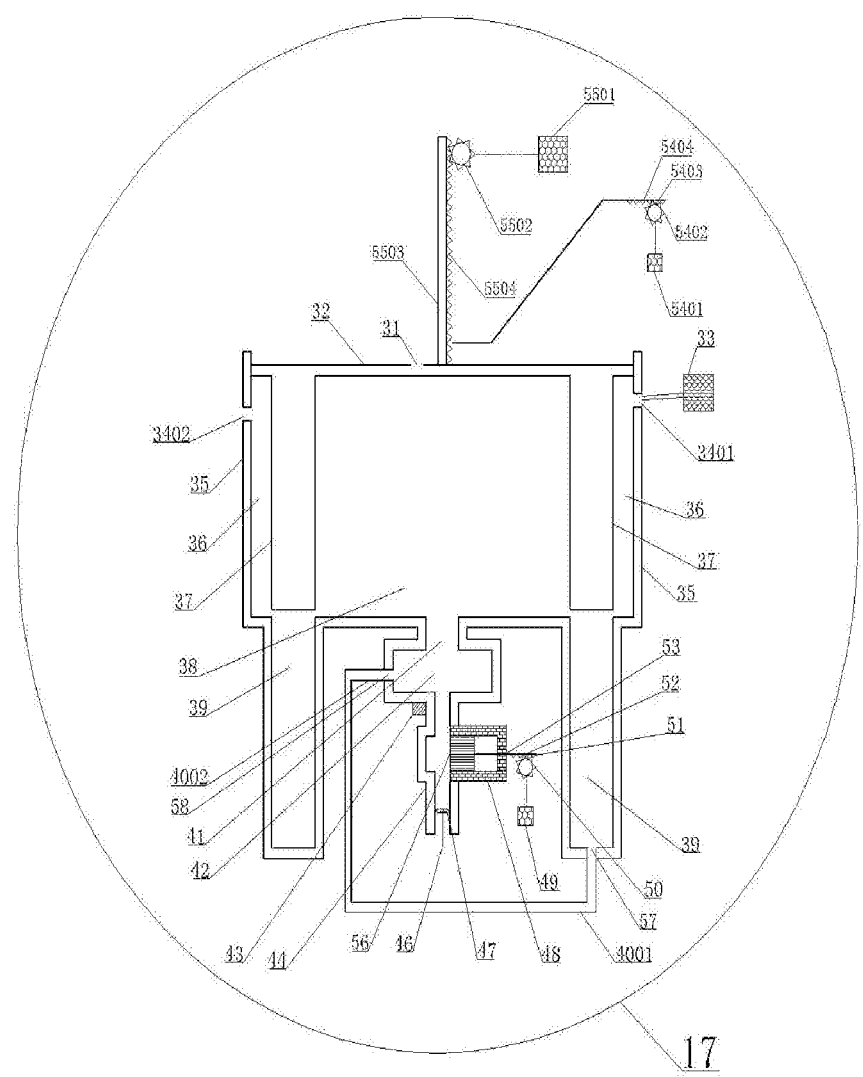
FIG. 17 is a schematic diagram of the one-dimensional internal combustion engine.
Figure 18:
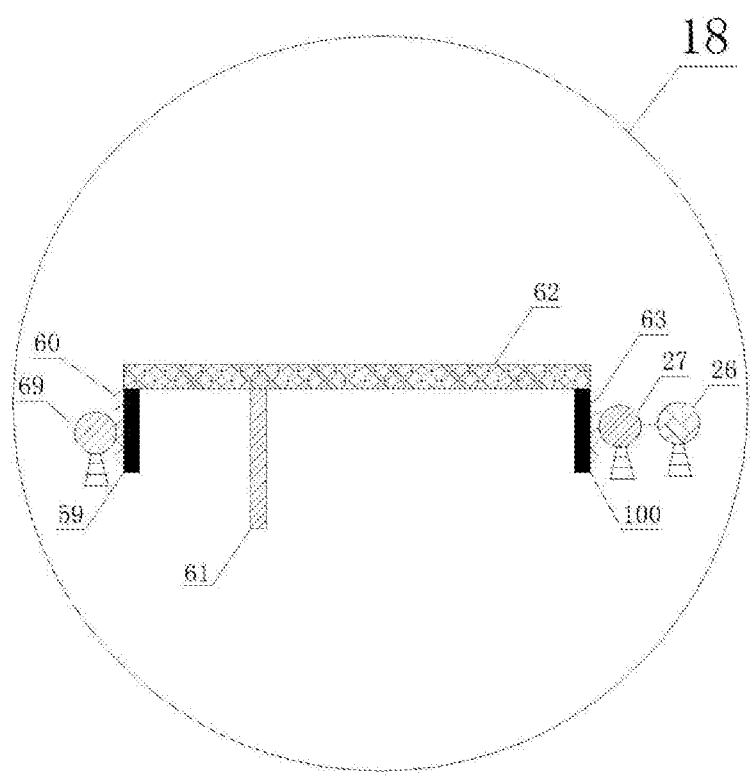
FIG. 18 is a schematic diagram of the first lever braking device.

As shown in FIGS. 1-18, the first driving system includes a gas compressor 88, a cylinder body in a gas compression device 9, a gas delivery pipe 78 (FIG. 8), a one-dimensional internal combustion engine 17 (FIG. 17), a tenth motor 200, an axial-flow gas compressor 89 and a first lever braking device 18 (FIG. 18). The tenth motor 200 is connected with the axial-flow gas compressor 89 (FIG. 7). The axial-flow gas compressor 89 is driven by the tenth motor 200.

Figure 1:
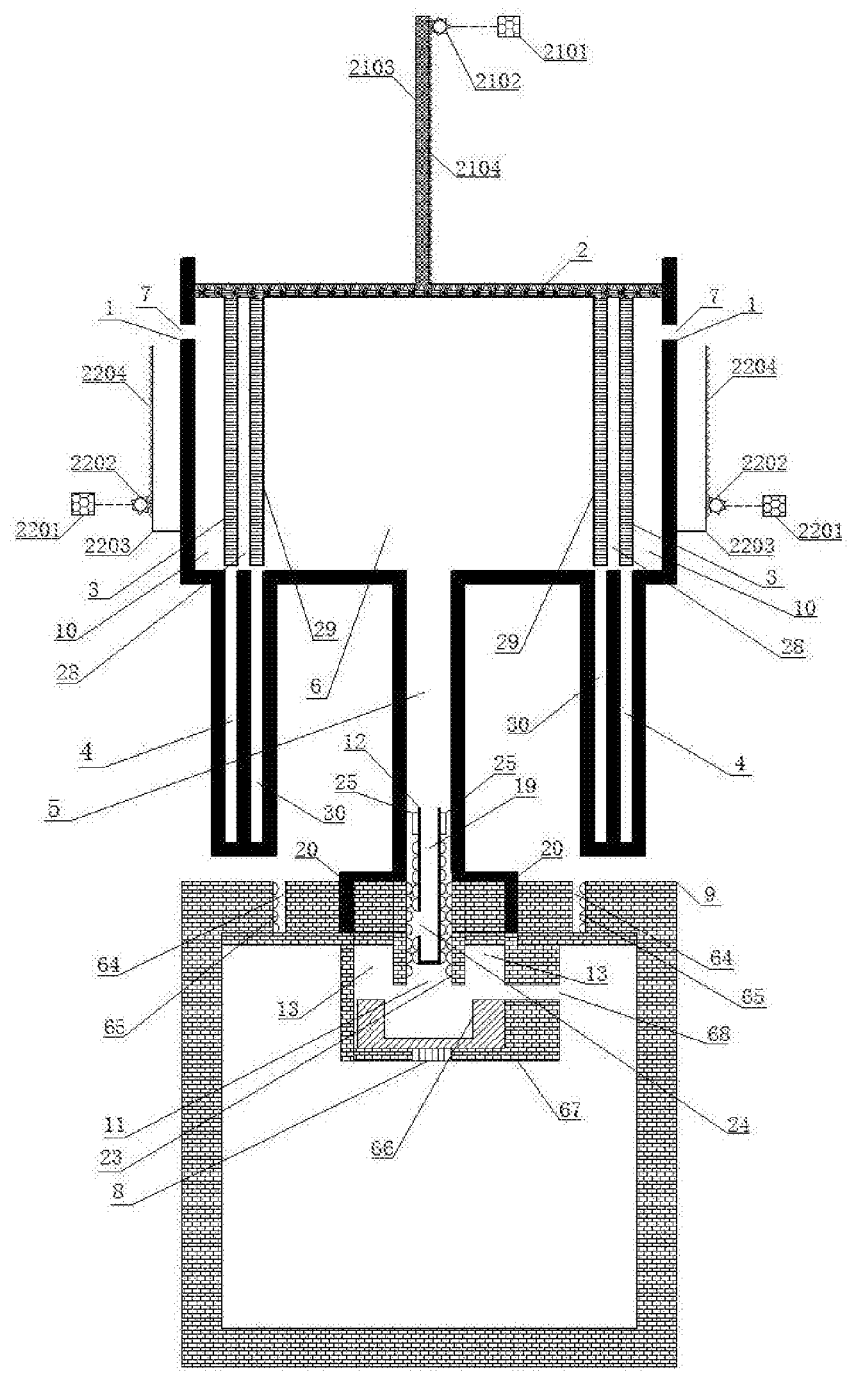
FIG. 1 is a schematic diagram of part of the natural gas storage device.

The gas compression device includes a rack, a gas compressor 88 (FIG. 9) disposed on an upper part of the rack, and the cylinder body 9 disposed on a lower part of the rack (as shown in FIG. 1).

Figure 16:
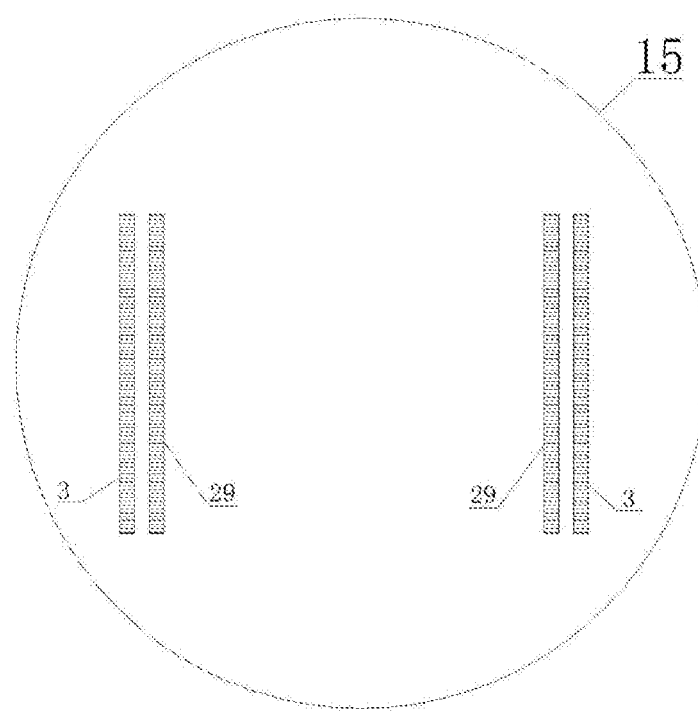
FIG. 16 is a schematic diagram of the dual-layer cylindrical plate.

The gas compressor 88 includes a first inner frame 14 (FIG. 15) and a first outer shell 1. The first inner frame 14 includes a first upper press plate 2 and a dual-layer cylindrical plate 15 (FIG. 16). The dual-layer cylindrical plate 15 includes a first-layer cylindrical plate 3 and a second-layer cylindrical plate 29. The first-layer cylindrical plate 3 has a cylindrical shape and a caliber less than a width of the first upper press plate 2. The second-layer cylindrical plate 29 also has a cylindrical shape and a caliber less than the caliber of the first-layer cylindrical plate 3. The first-layer cylindrical plate 3 is sleeved outside the second-layer cylindrical plate 29. A top of the first-layer cylindrical plate 3 is fixedly connected with a bottom of the first upper press plate 2. A top of the second-layer cylindrical plate 29 is also fixedly connected with the bottom of the first upper press plate 2. A first gas inlet 7 is formed in an upper part of the first outer shell 1. Part of a bottom of the first outer shell 1 is convex downward to form a dual-layer cylindrical plate groove corresponding to the dual-layer cylindrical plate 15. The dual-layer cylindrical plate groove includes a first-layer cylindrical plate groove 4 and a second-layer cylindrical plate groove 30. The first-layer cylindrical plate 3 can move up and down in the first-layer cylindrical plate groove 4. The second-layer cylindrical plate 29 can move up and down in the second-layer cylindrical plate groove 30. A first gas outlet 5 is also formed in the bottom of the first outer shell 1. The first inner frame 14 is disposed in the first outer shell 1, and a side surface of the first upper press plate 2 is bonded with an inner wall of the first outer shell 1. The first-layer cylindrical plate 3 forms a circle with part of the first upper press plate 2 and part of the first outer shell 1 to form a first assistant gas chamber 10. Part of the bottom of the first outer shell 1 forms a circle with the first-layer cylindrical plate 3, the second-layer cylindrical plate 29 and part of the first upper press plate 2 to form a second assistant gas chamber 28. The second-layer cylindrical plate 29 forms a circle with part of the bottom of the first outer shell 1 and part of the first upper press plate 2 to form a main gas chamber 6.

Figure 2:
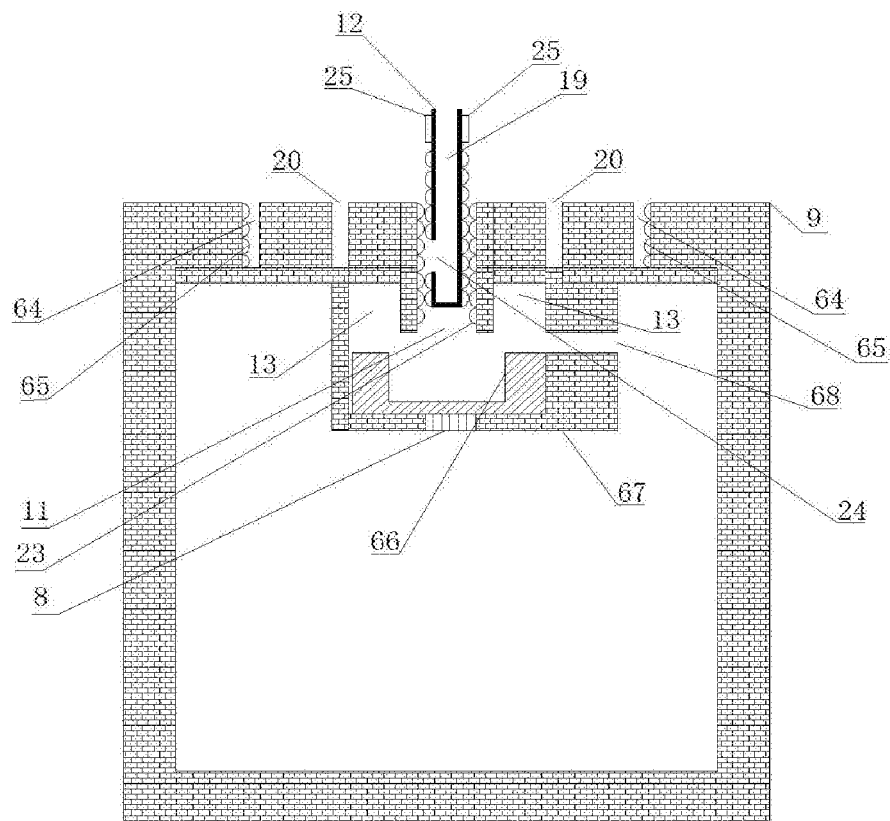
FIG. 2 is a schematic diagram of the cylinder body.
Figure 13:
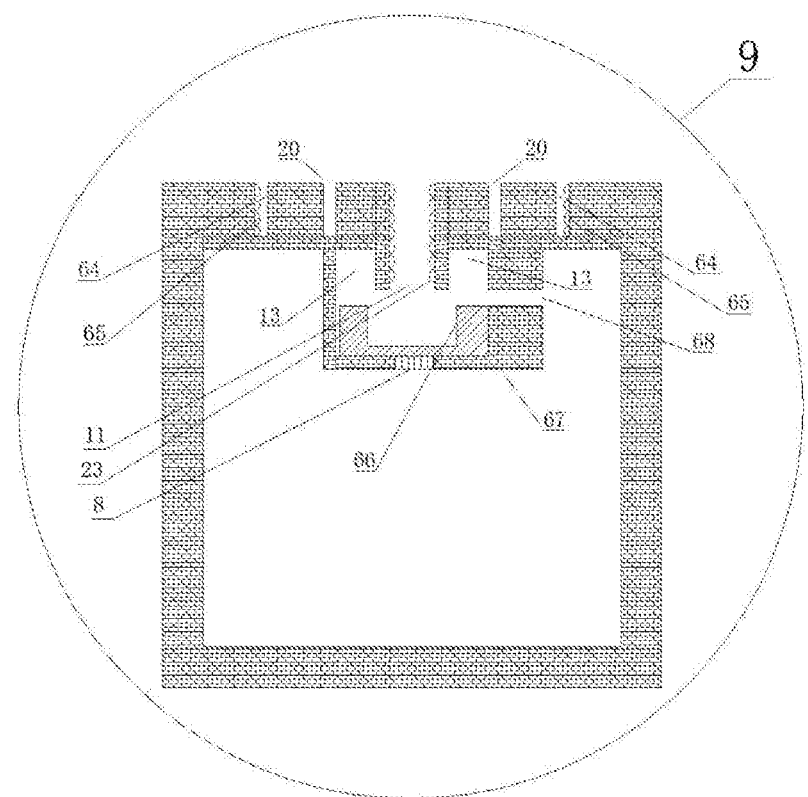
FIG. 13 is a schematic diagram of the cylinder body.
Figure 14:
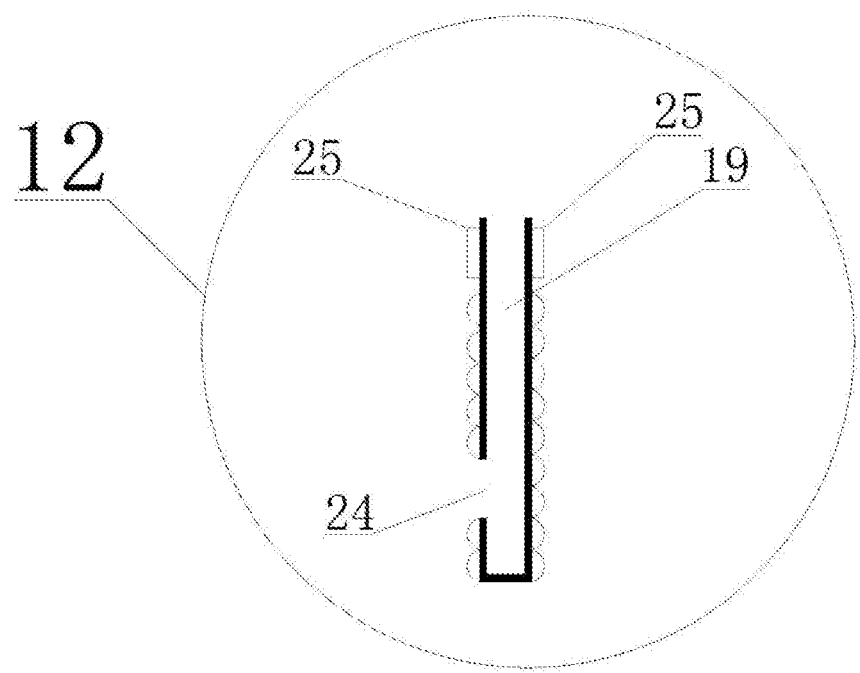
FIG. 14 is a schematic diagram of the thread cap.
Figure 15:
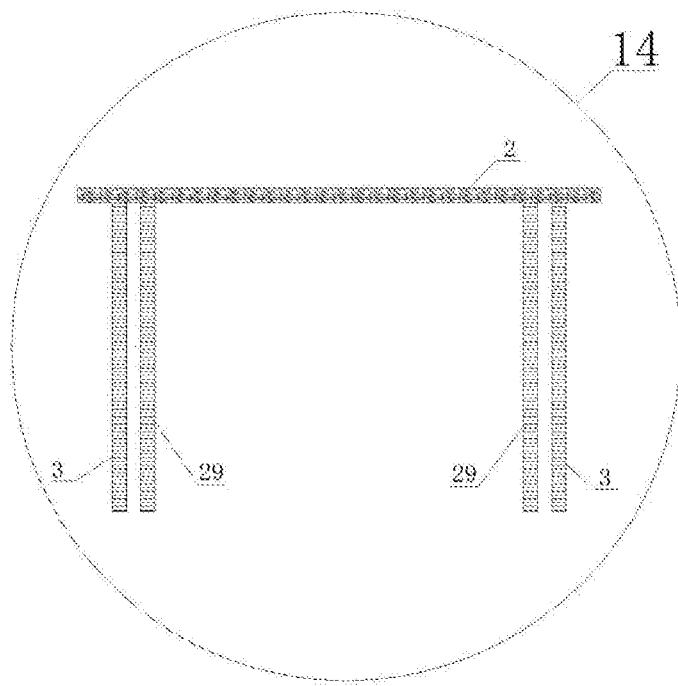
FIG. 15 is a schematic diagram of the first inner frame.

A second gas inlet 11 communicated with the first gas outlet 5 is formed in a top of the cylinder body 9 (as shown in FIGS. 2 and 13). A first thread 23 is disposed at a mouth edge of the second gas inlet 11. A thread cap 12 (FIG. 14) is disposed at the second gas inlet 11. Inside of the thread cap 12 is hollowed to form a gas outlet pipe 19. A second gas outlet 24 communicated with the gas outlet pipe 19 is formed in a left part of the thread cap 12. A third gear 25 is disposed at an outer wall of an upper part of the thread cap 12. The third gear 25 is fixed to the outer wall of the upper part of the thread cap 12. A thread matched with the first thread 23 at the mouth edge of the second gas inlet 11 is disposed at an outer wall of a lower part of the thread cap 12. A second gas inlet cover 66 is disposed below the thread cap 12. A longitudinal cross section of the second gas inlet cover 66 is in a "U" shape. The second gas inlet cover 66 is located in the cylinder body 9. A first groove 20 is formed in an upper part of part of the cylinder body 9 around the second gas inlet 11. A bottom end of the first gas outlet 5 is disposed in the first groove 20. A second groove 64 is formed in an upper part of part of the cylinder body 9 near the first groove 20. A second thread 65 is disposed in the second groove 64.

An upper part of the rack is provided with a first bracket. Second brackets are respectively disposed on a left side and a right side of the middle of the rack. A first driving device for driving the first upper press plate 2 to move up and down is disposed on the first bracket. Second driving devices for driving the gas compressor 88 to move up and down are disposed on the second brackets.

Figure 3:
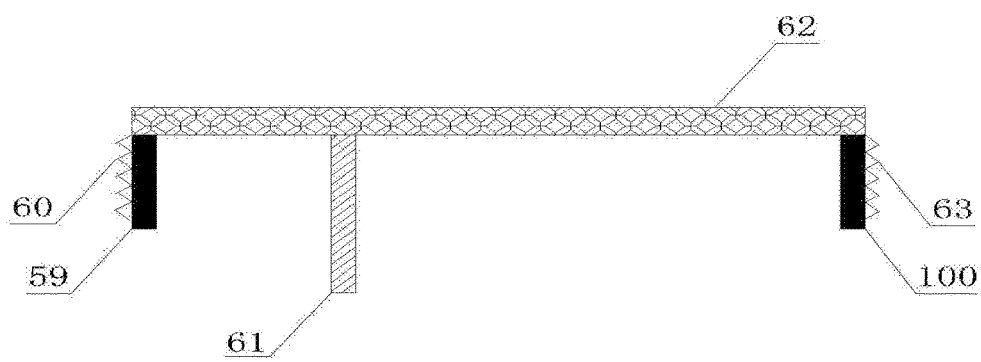
FIG. 3 is a schematic diagram of part of the first lever braking device.
Figure 12:
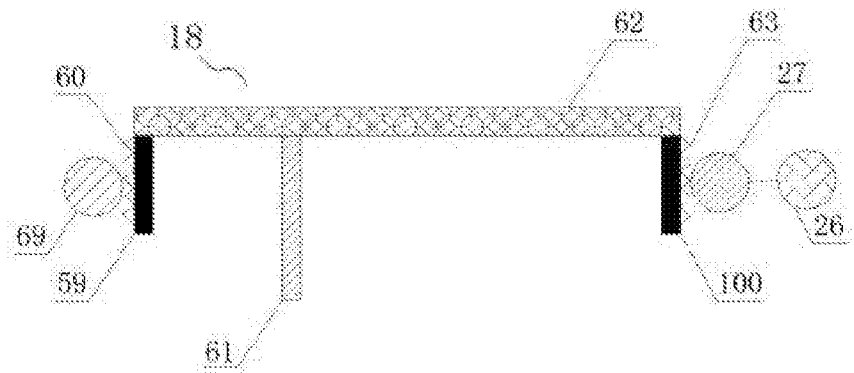
FIG. 12 is a connection diagram of the first lever braking device.

As shown in FIGS. 3 and 12, the first lever braking device 18 includes a third motor 26, a first bevel gear 27, a first vertical rod 100, a first lever 62, a second vertical rod 59, a second bevel gear 69, a third bracket, a fourth bracket, a fifth bracket and a sixth bracket. A third gear rack 63 is disposed on the first vertical rod 100. The third gear rack 63 is fixed to the first vertical rod 100. A fourth gear rack 60 is disposed on the second vertical rod 59. The fourth gear rack 60 is fixed to the second vertical rod 59. A top of the first vertical rod 100 is fixedly connected with a bottom end of a right part of the first lever 62. A top of the second vertical rod 59 is fixedly connected with a bottom end of a left part of the first lever 62. The third motor 26 is disposed on the third bracket. The first bevel gear 27 is disposed on the fourth bracket. The first lever 62 is disposed on the fifth bracket 61. The second bevel gear 69 is disposed on the sixth bracket. A fourth gear is disposed on the third motor 26. The first bevel gear 27 is engaged with the fourth gear on the third motor 26, and is also engaged with the third gear rack 63 on the first vertical rod 100. The second bevel gear 69 is engaged with the fourth gear rack 60 on the second vertical rod 59, and is also engaged with the third gear 25 on the thread cap 12.

Figure 4:
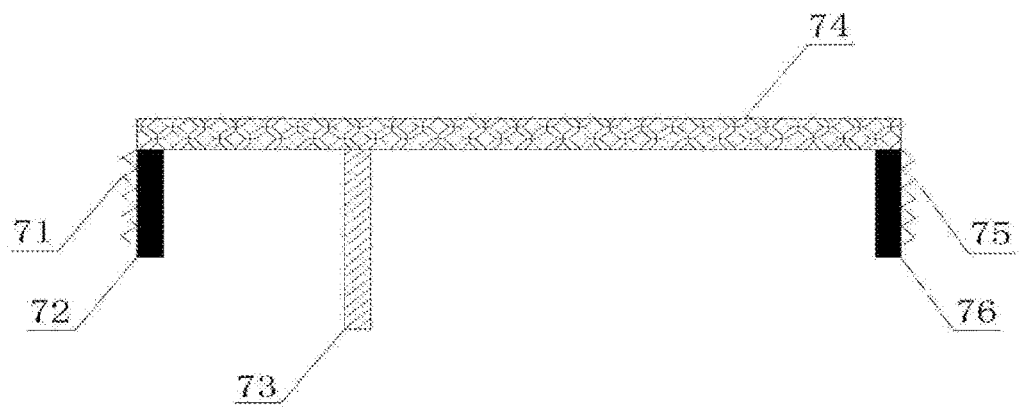
FIG. 4 is a schematic diagram of the second lever braking device.

A seventh bracket 73 is disposed on a right upper part of the rack. The first driving device includes a first motor 2101 disposed on the first bracket, a first gear 2102 disposed on the first bracket, a first dowel bar 2103 disposed vertically and having a bottom fixed to the first upper press plate 2, a first gear rack 2104 disposed on the first dowel bar 2103, and a second lever braking device (as shown in FIG. 4). The second lever braking device includes a third vertical rod 72, a second lever 74, a fourth vertical rod 76, a fifth gear rack 71 and a sixth gear rack 75. The second lever 74 is disposed on the seventh bracket 73. The fifth gear rack 71 is fixed to the third vertical rod 72. The sixth gear rack 75 is fixed to the fourth vertical rod 76. A top of the third vertical rod 72 is fixedly connected with a bottom end of a left part of the second lever 74. A top of the fourth vertical rod 76 is fixedly connected with a bottom end of a right part of the second lever 74. The first gear 2102 is engaged with the first gear rack 2104, and is also engaged with the fifth gear rack 71. A fifth gear is disposed on the first motor 2101. The fifth gear is engaged with the sixth gear rack 75.

Each of the second driving devices includes a second motor 2201 disposed on the second bracket, a second gear 2202 disposed on the second bracket and driven by the second motor 2201, ad second dowel bar 2203 in an "L" shape fixed to an outer wall of the first outer shell 1, and a second gear rack 2204 disposed on the second dowel bar 2203. The second gear 2202 is engaged with the second gear rack 2204. The second motor 2201 can drive the second gear 2202 to rotate. The action of the second driving devices is to push the gas compressor 88 up after the gas compressor 88 compresses gas, such that the bottom end of the first gas outlet 5 of the gas compressor 88 is separated from the first groove 20. The second driving devices are respectively disposed on the second brackets on the left side and the right side of the middle of the rack.

A second gas inlet cover holder 67 used to hold the second gas inlet cover 66 is disposed near the second gas inlet cover 66. A top of the second gas inlet cover holder 67 is fixedly connected with a bottom of part of the cylinder body 9 around the second gas inlet 11. The second gas inlet cover 66 is disposed in the second gas inlet cover holder 67. A cover groove 13 matched with part of an upper part of the second gas inlet cover 66 is formed in an upper part of the second gas inlet cover holder 67. Part of the upper part of the second gas inlet cover 66 can move up and down in the cover groove 13. A third gas inlet 68 communicated with an inner part of the cylinder body 9 is formed in a right part of the second gas inlet cover holder 67. A gas passage 8 communicated with the inner part of the cylinder body 9 is formed in a bottom of the second gas inlet cover holder 67.

Figure 5:
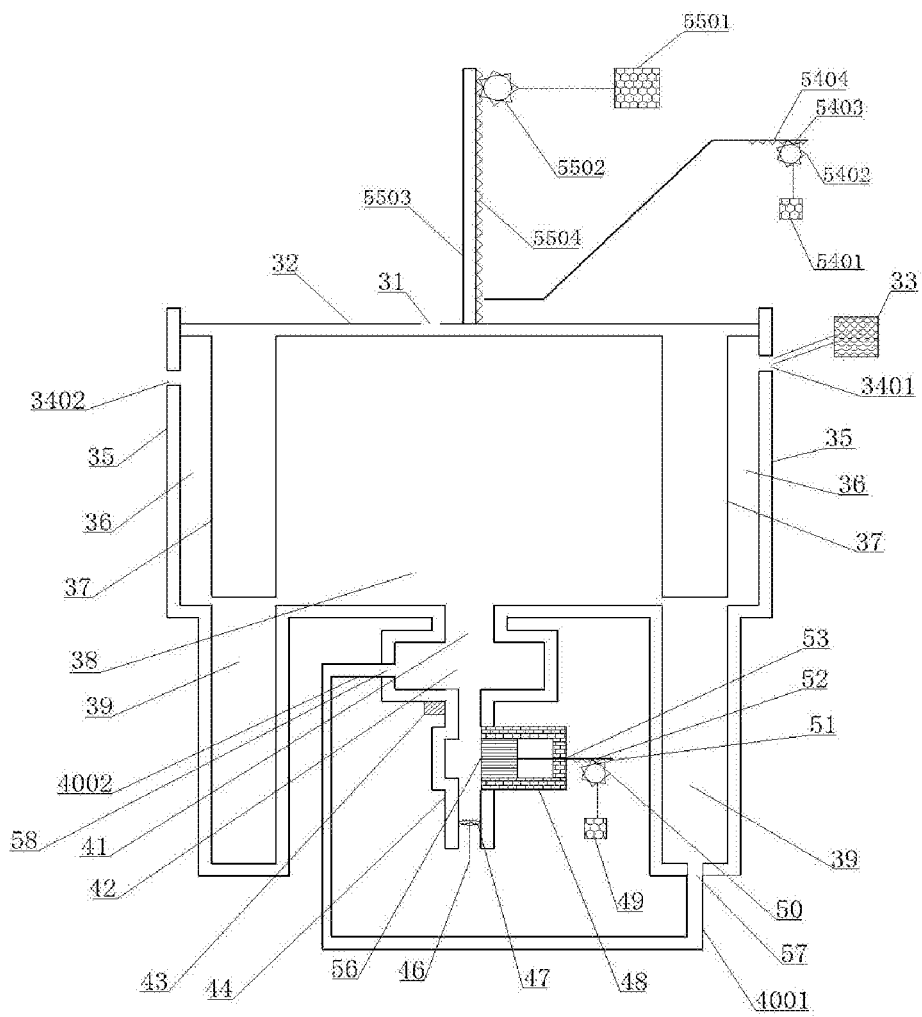
FIG. 5 is a schematic diagram of the one-dimensional internal combustion engine.

The one-dimensional internal combustion engine 17 includes a compressor, a combustion chamber 42, a pipeline, a spray pipe 44, a standby oil tank 33, an oil delivery pipe 99 (FIG. 10), a third driving device, a first safety device, a second safety device, an electrical ignition device 43, an eighth bracket, a ninth bracket, a tenth bracket and an eleventh bracket (as shown in FIG. 5). The third driving device is disposed on the eighth bracket. The first safety device is disposed on the ninth bracket. The second safety device is disposed on the tenth bracket. The standby oil tank 33 is disposed on the eleventh bracket. The oil delivery pipe 99 is disposed in the standby oil tank 33.

The pipeline is formed by connecting a left part 4001 of the pipeline and a right part 4002 of the pipeline. The compressor includes a second inner frame and a second outer shell 35. The second inner frame includes a second upper press plate 32 and an internal cylindrical plate 37. Inner parts of the second upper press plate 32 and the internal cylindrical plate 37 are hollow. A vent 31 is formed in the second upper press plate 32. A top of the internal cylindrical plate 37 is fixed to a lower side of the second upper press plate 32. The internal cylindrical plate 37 has a cylindrical shape, and has a caliber L less than a width M of the second upper press plate 32 (as shown in FIG. 6). A seventh gas inlet 3402 is formed in a left part of the second outer shell 35. A fifth gas inlet 3401 is formed in a right part of the second outer shell 35. The fifth gas inlet 3401 is located at a right lower side of the seventh gas inlet 3402. The axial-flow gas compressor 89 is disposed at a left upper side of the seventh gas inlet 3402. A gas outlet of the axial-flow gas compressor 89 is communicated with the seventh gas inlet 3402.

One end of the gas delivery pipe 78 is communicated with the fifth gas inlet 3401, and the other end of the gas delivery pipe 78 is communicated with the gas outlet pipe 19 in the gas compression device. Part of a bottom of the second outer shell 35 is convex downward to form an internal cylindrical plate groove 39 corresponding to the internal cylindrical plate 37. The internal cylindrical plate 37 can move up and down in the internal cylindrical plate groove 39. A sixth gas inlet 57 is formed in a bottom of the internal cylindrical plate groove 39. The left part 4001 of the pipeline is disposed at a lower side of the sixth gas inlet 57. The left part 4001 of the pipeline is communicated with the sixth gas inlet 57. An eighth gas inlet 58 is formed in a right part of the combustion chamber 42. The right part 4002 of the pipeline is disposed at a left side of the eighth gas inlet 58. The right part 4002 of the pipeline is communicated with the eighth gas inlet 58. The left part 4001 of the pipeline is communicated with the right part 4002 of the pipeline. An outlet 41 is also formed in the bottom of the second outer shell 35. A top end of combustion chamber 42 is fixedly connected with a bottom end of the outlet 41. A top end of the spray pipe 44 is fixedly connected with a bottom end of the combustion chamber 42. A small port is formed at a right part of the spray pipe 44.

A control box 48 is disposed at the small port. An adjusting ingot 56 is disposed in the control box 48. A left part of the control box 48 is communicated with the spray pipe 44, and a micropore 53 is formed at a right part of the control box 48. A turbo wheel 47 and a turboshaft 46 are disposed in a tail end of the spray pipe 44. The second inner frame is disposed in the second outer shell 35. A side surface of the second upper press plate 32 is bonded with an inner wall of an upper part of the second outer shell 35. The internal cylindrical plate 37 forms a circle with part of the second upper press plate 32 and part of the bottom of the second outer shell 35 to form a main pressure chamber 38. The internal cylindrical plate 37, rest part of the second upper press plate 32 except part of the second upper press plate 32 that participates in encircling to form the main pressure chamber 38, and part of the second outer shell 35 form a circle to form an assistant pressure chamber 36.

The third driving device includes a seventh motor 5501, a seventh gear 5502, a seventh dowel bar 5503 and a seventh gear rack 5504 disposed on the seventh dowel bar 5503. A bottom of the seventh dowel bar 5503 is fixed to an upper side of the second upper press plate 32. The seventh gear rack 5504 is engaged with the seventh gear 5502. The seventh motor 5501 can drive the seventh gear 5502 to rotate.

The first safety device includes an eighth motor 5401, an eighth gear 5402, a bumper 5403 and an eighth gear rack 5404 fixed to a lower side of a right part of the bumper 5403. The eighth motor 5401 can drive the eighth gear 5402 to rotate. The eighth gear rack 5404 is engaged with the eighth gear 5402. The action of the bumper 5403 is to insert a left part of the bumper 5403 into the middle of the seventh gear rack 5504 to prevent the seventh gear rack 5504 from moving up.

The second safety device is disposed at a right side of the control box 48. The second safety device includes a ninth motor 49, a ninth gear 50, a ninth dowel bar 52 and a ninth gear rack 51. The ninth motor 49 can drive the ninth gear 50 to rotate. A left part of the ninth dowel bar 52 extends into the control box 48 from the micropore 53. The ninth gear rack 51 is disposed at a lower side of a right part of the ninth dowel bar 52. The ninth gear rack 51 is fixedly connected with the right part of the ninth dowel bar 52. The ninth gear rack 51 is engaged with the ninth gear 50. A right part of the adjusting ingot 56 is fixedly connected with a left part of the ninth dowel bar 52. The adjusting ingot 56 and part of the left part of the ninth dowel bar 52 can move left and right in the control box 48.

The standby oil tank 33 is disposed at a right upper side of the fifth gas inlet 3401. The electrical ignition device 43 is disposed at a left side of the spray pipe 44.

The turboshaft 46 in the first driving system is fixedly connected with a rotor on the axial-flow gas compressor 89 in the second driving system. The turboshaft 46 in the second driving system is fixedly connected with a rotor on the axial-flow gas compressor 89 in the third driving system. The turboshaft 46 in the third driving system is fixedly connected with a rotor on the axial-flow gas compressor 89 in the fourth driving system. The turboshaft 46 in the fourth driving system is fixedly connected with a rotor on the axial-flow gas compressor 89 in the first driving system.

The specific operation process of the present disclosure is as follows:

1. The thread cap 12 is rotated downward so that the second gas outlet 24 is communicated with the cylinder body 9.

2. Natural gas enters the first assistant gas chamber 10, the first-layer cylindrical plate groove 4, the second assistant gas chamber 28, the second-layer cylindrical plate groove 30 and the main gas chamber 6 successively from the first gas inlet 7.

3. After started, the first motor 2101 drives the first dowel bar 2103 to move down; and the upper press plate 2 also moves down and compresses the gas in the main gas chamber 6. In the process of compression, the intensity of pressure of the gas in the first assistant gas chamber 10, the intensity of pressure of the gas in the first-layer cylindrical plate groove 4, the intensity of pressure of the gas in the second assistant gas chamber 28, the intensity of pressure of the gas in the second-layer cylindrical plate groove 30 and the intensity of pressure of the gas in the main gas chamber 6 are progressively increased, so as to reduce leakage of the gas in the main gas chamber 6. The compressed gas is sprayed out of the first gas outlet 5 and enters the second gas inlet 11, the third gas inlet 68 and the cylinder body 9 successively.

4. After started, the second motor 2201 drives the second dowel bar 2203 to move up. The second dowel bar 2203 pushes the gas compressor 88 to move up so that the bottom end of the first gas outlet 5 is separated out of the groove 20. In this process, because the gas in the gas passage 8 has an action of pushing the second gas inlet cover 66, such that the second gas inlet cover 66 moves up and enters the cover groove 13.

5. The thread cap 12 is rotated upward to prevent the gas in the cylinder body 9 from escaping out of the second gas outlet 24.

6. The gas outlet pipe 19 in the gas compression device is connected with the gas delivery pipe 78.

7. The ninth motor 49 in the first driving system is started so that the ninth dowel bar 52 moves left to close the spray pipe 44 in the first driving system.

8. The tenth motor 200 in the first driving system is started so that the axial-flow gas compressor 89 in the first driving system is operated. Air enters the seventh gas inlet 3402, the assistant pressure chamber 36, the internal cylindrical plate groove 39 and the main pressure chamber 38 successively from the gas outlet of the axial-flow gas compressor 89.

9. The seventh motor 5501 in the first driving system is started so that the left part of the bumper 5403 is inserted into the middle of the seventh gear rack 5504 after the second upper press plate 32 moves down for a certain distance, so as to prevent the seventh gear rack 5504 from moving up.

10. The third motor 26 in the first driving system is started so that the thread cap 12 moves down. The natural gas escapes from the cylinder body 9 and enters the one-dimensional internal combustion engine 17 through the gas delivery pipe 78.

11. The seventh motor 5501 in the first driving system is started so that the left part of the bumper 5403 can be inserted into the middle of the seventh gear rack 5504 after the second upper press plate 32 also moves down for a certain distance, so as to prevent the seventh gear rack 5504 from moving up.

12. The electrical ignition device 43 in the first driving system ignites mixed gas in the one-dimensional internal combustion engine 17.

13. The ninth motor 49 in the first driving system is started reversely so that the ninth dowel bar 52 moves right to open the spray pipe 44. The gas in the one-dimensional internal combustion engine 17 is sprayed out of the spray pipe 44 and acts on the turbo wheel 47 and the turboshaft 46 in the first driving system so that the turbo wheel 47 and the turboshaft 46 rotate.

14. The turboshaft 46 in the first driving system drives the rotor on the axial-flow gas compressor 89 in the second driving system to rotate together. The air enters the seventh gas inlet 3402, the assistant pressure chamber 36, the internal cylindrical plate groove 39 and the main pressure chamber 38 successively from the gas outlet of the axial-flow gas compressor 89 in the second driving system.

15. The seventh motor 5501 in the second driving system is started so that the left part of the bumper 5403 can be inserted into the middle of the seventh gear rack 5504 after the second upper press plate 32 also moves down for a certain distance, so as to prevent the seventh gear rack 5504 from moving up.

16. The third motor 26 in the second driving system is started so that the thread cap 12 moves down. The natural gas escapes from the cylinder body 9 and enters the one-dimensional internal combustion engine 17 through the gas delivery pipe 78.

17. The seventh motor 5501 in the second driving system is started so that the left part of the bumper 5403 can be inserted into the middle of the seventh gear rack 5504 after the second upper press plate 32 also moves down for a certain distance, so as to prevent the seventh gear rack 5504 from moving up.

18. The electrical ignition device 43 in the second driving system ignites the mixed gas in the one-dimensional internal combustion engine 17.

19. The ninth motor 49 in the second driving system is started reversely so that the ninth dowel bar 52 moves right to open the spray pipe 44. The gas in the one-dimensional internal combustion engine 17 is sprayed out of the spray pipe 44 and acts on the turbo wheel 47 and the turboshaft 46 in the first driving system so that the turbo wheel 47 and the turboshaft 46 rotate.

20. The turboshaft 46 in the second driving system drives the rotor on the axial-flow gas compressor 89 in the third driving system to rotate together. The air enters the seventh gas inlet 3402, the assistant pressure chamber 36, the internal cylindrical plate groove 39 and the main pressure chamber 38 successively from the gas outlet of the axial-flow gas compressor 89 in the third driving system.

21. The seventh motor 5501 in the third driving system is started so that the left part of the bumper 5403 can be inserted into the middle of the seventh gear rack 5504 after the second upper press plate 32 also moves down for a certain distance, so as to prevent the seventh gear rack 5504 from moving up.

22. The third motor 26 in the third driving system is started so that the thread cap 12 moves down. The natural gas escapes from the cylinder body 9 and enters the one-dimensional internal combustion engine 17 through the gas delivery pipe 78.

23. The seventh motor 5501 in the third driving system is started so that the left part of the bumper 5403 can be inserted into the middle of the seventh gear rack 5504 after the second upper press plate 32 also moves down for a certain distance, so as to prevent the seventh gear rack 5504 from moving up.

24. The electrical ignition device 43 in the third driving system ignites the mixed gas in the one-dimensional internal combustion engine 17.

25. The ninth motor 49 in the third driving system is started reversely so that the ninth dowel bar 52 moves right to open the spray pipe 44. The gas in the one-dimensional internal combustion engine 17 is sprayed out of the spray pipe 44 and acts on the turbo wheel 47 and the turboshaft 46 in the first driving system so that the turbo wheel 47 and the turboshaft 46 rotate.

26. The turboshaft 46 in the third driving system drives the rotor on the axial-flow gas compressor 89 in the fourth driving system to rotate together. The air enters the seventh gas inlet 3402, the assistant pressure chamber 36, the internal cylindrical plate groove 39 and the main pressure chamber 38 successively from the gas outlet of the axial-flow gas compressor 89 in the fourth driving system.

27. The seventh motor 5501 in the fourth driving system is started so that the left part of the bumper 5403 can be inserted into the middle of the seventh gear rack 5504 after the second upper press plate 32 also moves down for a certain distance, so as to prevent the seventh gear rack 5504 from moving up.

28. The third motor 26 in the fourth driving system is started so that the thread cap 12 moves down. The natural gas escapes from the cylinder body 9 and enters the one-dimensional internal combustion engine 17 through the gas delivery pipe 78.

29. The seventh motor 5501 in the fourth driving system is started so that the left part of the bumper 5403 can be inserted into the middle of the seventh gear rack 5504 after the second upper press plate 32 also moves down for a certain distance, so as to prevent the seventh gear rack 5504 from moving up.

30. The electrical ignition device 43 in the fourth driving system ignites the mixed gas in the one-dimensional internal combustion engine 17.

31. The ninth motor 49 in the fourth driving system is started reversely so that the ninth dowel bar 52 moves right to open the spray pipe 44. The gas in the one-dimensional internal combustion engine 17 is sprayed out of the spray pipe 44 and acts on the turbo wheel 47 and the turboshaft 46 in the first driving system so that the turbo wheel 47 and the turboshaft 46 rotate.

32. The turboshaft 46 in the fourth driving system drives the rotor on the axial-flow gas compressor 89 in the first driving system to rotate together. The air enters the seventh gas inlet 3402, the assistant pressure chamber 36, the internal cylindrical plate groove 39 and the main pressure chamber 38 successively from the gas outlet of the axial-flow gas compressor 89 in the first driving system.

33. If the natural gas runs out, the gas delivery pipe 78 is moved away. The oil delivery pipe 99 is connected into the fifth gas inlet 3401. Gasoline enters the one-dimensional internal combustion engine 17 from the oil delivery pipe 99. The remaining operation steps are roughly the same as those when the fuel is the natural gas.

Parts not explained especially in the above description are the prior art, or can be achieved by the prior art. Any equivalent change and modification made according to the content of the scope of the application patent of the present disclosure shall be taken as the technical category of the present disclosure.

What is claimed is:

1. A turbocharged dual-fuel engine, comprising a first driving system, a second driving system, a third driving system and a fourth driving system, wherein the first driving system, the second driving system, the third driving system and the fourth driving system have the same structure;

the first driving system comprises a gas compressor, a cylinder body in a gas compression device, a gas delivery pipe, a one-dimensional internal combustion engine, a tenth motor, an axial-flow gas compressor and a first lever braking device in a natural gas storage device; the tenth motor is connected with the axial-flow gas compressor; and the axial-flow gas compressor is driven by the tenth motor;

the gas compression device comprises a rack, a gas compressor disposed on an upper part of the rack, and the cylinder body disposed on a lower part of the rack;

the gas compressor comprises a first inner frame and a first outer shell; the first inner frame comprises a first upper press plate and a dual-layer cylindrical plate; the dual-layer cylindrical plate comprises a first-layer cylindrical plate and a second-layer cylindrical plate; the first-layer cylindrical plate has a cylindrical shape and a caliber less than a width of the first upper press plate; the second-layer cylindrical plate also has a cylindrical shape and a caliber less than the caliber of the first-layer cylindrical plate; the first-layer cylindrical plate is sleeved outside the second-layer cylindrical plate; a top of the first-layer cylindrical plate is fixedly connected with a bottom of the first upper press plate; a top of the second-layer cylindrical plate is also fixedly connected with the bottom of the first upper press plate; a first gas inlet is formed in an upper part of the first outer shell; part of a bottom of the first outer shell is convex downward to form a dual-layer cylindrical plate groove corresponding to the dual-layer cylindrical plate; the dual-layer cylindrical plate groove comprises a first-layer cylindrical plate groove and a second-layer cylindrical plate groove; the first-layer cylindrical plate moves up and down in the first-layer cylindrical plate groove; the second-layer cylindrical plate moves up and down in the second-layer cylindrical plate groove; a first gas outlet is also formed in the bottom of the first outer shell; the first inner frame is disposed in the first outer shell, and a side surface of the first upper press plate is bonded with an inner wall of the first outer shell; the first-layer cylindrical plate forms a circle with part of the first upper press plate and part of the first outer shell to form a first assistant gas chamber; part of the bottom of the first outer shell forms a circle with the first-layer cylindrical plate, the second-layer cylindrical plate and part of the first upper press plate to form a second assistant gas chamber; the second-layer cylindrical plate forms a circle with part of the bottom of the first outer shell and part of the first upper press plate to form a main gas chamber;

a second gas inlet communicated with the first gas outlet is formed in a top of the cylinder body; a first thread is disposed at a mouth edge of the second gas inlet; a thread cap is disposed at the second gas inlet; inside of the thread cap is hollowed to form a gas outlet pipe; a second gas outlet communicated with the gas outlet pipe is formed in a left part of the thread cap; a third gear is disposed at an outer wall of an upper part of the thread cap; the third gear is fixed to the outer wall of the upper part of the thread cap; a thread matched with the first thread at the mouth edge of the second gas inlet is disposed at an outer wall of a lower part of the thread cap; a second gas inlet cover is disposed below the thread cap; a longitudinal cross section of the second gas inlet cover is in a "U" shape; the second gas inlet cover is located in the cylinder body; a first groove is formed in an upper part of part of the cylinder body around the second gas inlet; a bottom end of the first gas outlet is disposed in the first groove; a second groove is formed in an upper part of part of the cylinder body near the first groove; and a second thread is disposed in the second groove;

an upper part of the rack is provided with a first bracket; second brackets are respectively disposed on a left side and a right side of the middle of the rack; a first driving device for driving the first upper press plate to move up and down is disposed on the first bracket; and second driving devices for driving the gas compressor to move up and down are disposed on the second brackets;

the first lever braking device comprises a third motor, a first bevel gear, a first vertical rod, a first lever, a second vertical rod, a second bevel gear, a third bracket, a fourth bracket, a fifth bracket and a sixth bracket; a third gear rack is disposed on the first vertical rod; the third gear rack is fixed to the first vertical rod; a fourth gear rack is disposed on the second vertical rod; the fourth gear rack is fixed to the second vertical rod; a top of the first vertical rod is fixedly connected with a bottom end of a right part of the first lever; a top of the second vertical rod is fixedly connected with a bottom end of a left part of the first lever; the third motor is disposed on the third bracket; the first bevel gear is disposed on the fourth bracket; the first lever is disposed on the fifth bracket; the second bevel gear is disposed on the sixth bracket; a fourth gear is disposed on the third motor; the first bevel gear is engaged with the fourth gear on the third motor, and is also engaged with the third gear rack on the first vertical rod; and the second bevel gear is engaged with the fourth gear rack on the second vertical rod, and is also engaged with the third gear on the thread cap;

a seventh bracket is disposed on a right upper part of the rack; the first driving device comprises a first motor disposed on the first bracket, a first gear disposed on the first bracket, a first dowel bar disposed vertically and having a bottom end fixed to the first upper press plate, a first gear rack disposed on the first dowel bar, and a second lever braking device; the second lever braking device comprises a third vertical rod, a second lever, a fourth vertical rod, a fifth gear rack and a sixth gear rack; the second lever is disposed on the seventh bracket; the fifth gear rack is fixed to the third vertical rod; the sixth gear rack is fixed to the fourth vertical rod; a top of the third vertical rod is fixedly connected with a bottom end of a left part of the second lever; a top of the fourth vertical rod is fixedly connected with a bottom end of a right part of the second lever; the first gear is engaged with the first gear rack, and is also engaged with the fifth gear rack; a fifth gear is disposed on the first motor; and the fifth gear is engaged with the sixth gear rack;

each of the second driving devices comprises a second motor disposed on the second bracket, a second gear disposed on the second bracket and driven by the second motor, a second dowel bar in an "L" shape fixed to an outer wall of the first outer shell, and a second gear rack disposed on the second dowel bar; the second gear is engaged with the second gear rack; the second motor drives the second gear to rotate; the action of the second driving devices is to push the gas compressor up after the gas compressor compresses gas, such that the bottom end of the first gas outlet of the gas compressor is separated from the first groove; and the second driving devices are respectively disposed on the second brackets on the left side and the right side of the middle of the rack;

a second gas inlet cover holder used to hold the second gas inlet cover is disposed near the second gas inlet cover; a top of the second gas inlet cover holder is fixedly connected with a bottom of part of the cylinder body around the second gas inlet; the second gas inlet cover is disposed in the second gas inlet cover holder; a cover groove matched with part of an upper part of the second gas inlet cover is formed in an upper part of the second gas inlet cover holder; part of the upper part of the second gas inlet cover moves up and down in the cover groove; a third gas inlet communicated with an inner part of the cylinder body is formed in a right part of the second gas inlet cover holder; and a gas passage communicated with the inner part of the cylinder body is formed in a bottom of the second gas inlet cover holder;

the one-dimensional internal combustion engine comprises a compressor, a combustion chamber, a pipeline, a spray pipe, a standby oil tank, an oil delivery pipe, a third driving device, a first safety device, a second safety device, an electrical ignition device, an eighth bracket, a ninth bracket, a tenth bracket and an eleventh bracket; the third driving device is disposed on the eighth bracket; the first safety device is disposed on the ninth bracket; the second safety device is disposed on the tenth bracket; the standby oil tank is disposed on the eleventh bracket; and the oil delivery pipe is disposed in the standby oil tank;

the pipeline is formed by connecting a left part of the pipeline and a right part of the pipeline; the compressor comprises a second inner frame and a second outer shell; the second inner frame comprises a second upper press plate and an internal cylindrical plate; inner parts of the second upper press plate and the internal cylindrical plate are hollow; a vent is formed in the second upper press plate; a top of the internal cylindrical plate is fixed to a lower side of the second upper press plate; the internal cylindrical plate has a cylindrical shape, and has a caliber L less than a width M of the second upper press plate; a seventh gas inlet is formed in a left part of the second outer shell; a fifth gas inlet is formed in a right part of the second outer shell; the fifth gas inlet is located at a right lower side of the seventh gas inlet; the axial-flow gas compressor is disposed at a left upper side of the seventh gas inlet; and a gas outlet of the axial-flow gas compressor is communicated with the seventh gas inlet;

one end of the gas delivery pipe is communicated with the fifth gas inlet, and the other end of the gas delivery pipe is communicated with the gas outlet pipe in the gas compression device; part of a bottom of the second outer shell is convex downward to form an internal cylindrical plate groove corresponding to the internal cylindrical plate; the internal cylindrical plate moves up and down in the internal cylindrical plate groove; a sixth gas inlet is formed in a bottom of the internal cylindrical plate groove; the left part of the pipeline is disposed at a lower side of the sixth gas inlet; the left part of the pipeline is communicated with the sixth gas inlet; an eighth gas inlet is formed in a right part of the combustion chamber; the right part of the pipeline is disposed at a left side of the eighth gas inlet; the right part of the pipeline is communicated with the eighth gas inlet; the left part of the pipeline is communicated with the right part of the pipeline; an outlet is also formed in the bottom of the second outer shell; a top end of combustion chamber is fixedly connected with a bottom end of the outlet; a top end of the spray pipe is fixedly connected with a bottom end of the combustion chamber; a small port is formed at a right part of the spray pipe; a control box is disposed at the small port; an adjusting ingot is disposed in the control box; a left part of the control box is communicated with the spray pipe, and a micropore is formed at a right part of the control box; a turbo wheel and a turboshaft are disposed in a tail end of the spray pipe; the second inner frame is disposed in the second outer shell; a side surface of the second upper press plate is bonded with an inner wall of an upper part of the second outer shell; the internal cylindrical plate forms a circle with part of the second upper press plate and part of the bottom of the second outer shell to form a main pressure chamber; and the internal cylindrical plate, rest part of the second upper press plate except part of the second upper press plate that participates in encircling to form the main pressure chamber, and part of the second outer shell form a circle to form an assistant pressure chamber;

the third driving device comprises a seventh motor, a seventh gear, a seventh dowel bar and a seventh gear rack disposed on the seventh dowel bar; a bottom of the seventh dowel bar is fixed to an upper side of the second upper press plate; the seventh gear rack is engaged with the seventh gear; and the seventh motor drives the seventh gear to rotate;

the first safety device comprises an eighth motor, an eighth gear, a bumper and an eighth gear rack fixed to a lower side of the right part of the bumper; the eighth motor drives the eighth gear to rotate; the eighth gear rack is engaged with the eighth gear; and the action of the bumper is to insert a left part of the bumper into the middle of the seventh gear rack to prevent the seventh gear rack from moving up;

the second safety device is disposed at a right side of the control box; the second safety device comprises a ninth motor, a ninth gear, a ninth dowel bar and a ninth gear rack; the ninth motor drives the ninth gear to rotate; a left part of the ninth dowel bar extends into the control box (48) from the micropore; the ninth gear rack is disposed at a lower side of a right part of the ninth dowel bar; the ninth gear rack is fixedly connected with a right part of the ninth dowel bar; the ninth gear rack is engaged with the ninth gear; a right part of the adjusting ingot is fixedly connected with a left part of the ninth dowel bar; and the adjusting ingot and part of the left part of the ninth dowel bar moves left and right in the control box;

the standby oil tank is disposed at a right upper side of the fifth gas inlet; and the electrical ignition device is disposed at a left side of the spray pipe; and the turboshaft in the first driving system is fixedly connected with a rotor on the axial-flow gas compressor in the second driving system; the turboshaft in the second driving system is fixedly connected with a rotor on the axial-flow gas compressor in the third driving system; the turboshaft in the third driving system is fixedly connected with a rotor on the axial-flow gas compressor in the fourth driving system; and the turboshaft in the fourth driving system is fixedly connected with a rotor on the axial-flow gas compressor in the first driving system.

* * * * *